United States Patent [19]

Weber

[11] Patent Number: 5,047,906
[45] Date of Patent: Sep. 10, 1991

[54] LAMP FOR VEHICLE

[75] Inventor: Walter K. Weber, Grand Rapids, Mich.

[73] Assignee: KB Lighting Inc., Kentwood, Mich.

[21] Appl. No.: 495,463

[22] Filed: Mar. 16, 1990

[51] Int. Cl.⁵ ............................................. B60Q 1/00
[52] U.S. Cl. .................................... 362/80; 362/390; 362/282
[58] Field of Search .................. 362/61, 80, 374, 375, 362/327, 328, 307, 308, 277, 282, 418, 430, 390, 369

[56] References Cited

U.S. PATENT DOCUMENTS

| | | | |
|---|---|---|---|
| 4,318,161 | 3/1982 | Shanks | 362/61 |
| 4,554,617 | 11/1985 | Tyler | 362/61 |
| 4,569,007 | 2/1986 | Dick | 362/296 |
| 4,663,696 | 5/1987 | Miyazawa et al. | 362/346 |
| 4,881,152 | 11/1989 | Watanabe et al. | 362/61 |
| 4,907,134 | 3/1990 | Mori | 362/61 |

Primary Examiner—Ira S. Lazarus
Assistant Examiner—D. M. Cox
Attorney, Agent, or Firm—Michael J. Striker

[57] ABSTRACT

A lamp for a vehicle comprises a lens, a reflector, a supporting casing supporting the lens and the reflector, a housing, and an element for compensating manufacturing tolerances and dampening vibrations and including an elastic element arranged between the supporting casing and the housing.

8 Claims, 2 Drawing Sheets

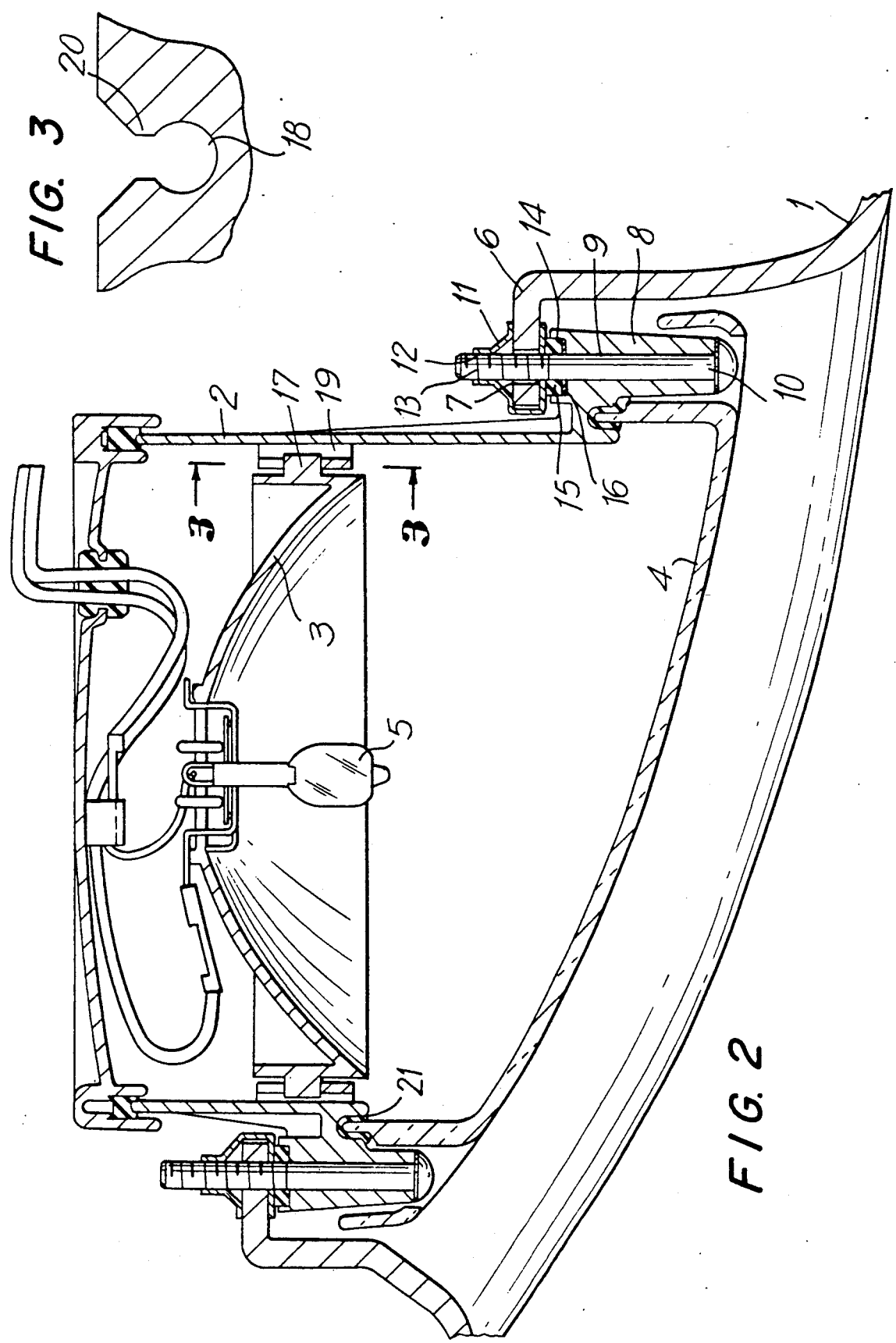

LAMP FOR VEHICLE

BACKGROUND OF THE INVENTION

The present invention generally relates to lamps for vehicles, preferably to fog lamps for vehicles.

Lamps for vehicles are known in many variations. The known lamps generally include a housing, as well as a reflector, a lens, and a light source located between the reflector and the lens. During manufacture of such lamps, usually significant tolerances occur, and the tolerances must be compensated for. Also, during driving the lamps are subjected to vibrations which can undesirably affect their performance. It is therefore desirable to provide a lamp with such a construction which can easily compensate for manufacturing tolerances and dampen operating vibrations of the lamp.

SUMMARY OF THE INVENTION

Accordingly, it is an object of the present invention to provide a lamp of the above mentioned general type which is further improved in the sense of compensating for manufacturing tolerances and dampening of operating vibrations.

In keeping with these objects and with others which will become apparent hereinafter, one feature of the present invention resides, briefly stated, in a lamp which has a supporting casing, a reflector mounted on the supporting casing, a lens mounted on the supporting casing, a housing, and elastic means provided between the supporting casing and the housing for compensating manufacturing tolerances and dampening operating vibrations.

The above mentioned means can be formed as an elastic element provided between the supporting casing and the housing of the lamp.

When the lamp is designed in accordance with the present invention, it eliminates the disadvantages of the prior art and provides for highly advantageous results in efficient compensation of manufacturing tolerances and dampening of operating vibrations.

The elastic element can include a plurality of elastic members distributed over a periphery at distances from one another and located between the supporting casing and the housing.

The housing can have an inwardly directed flange, the supporting casing can have a plurality of projections spaced from one another in a peripheral direction, and each of the elastic members can be located between the housing and a respective one of the projections of the supporting casing.

The projections can have a receiving hole, and each of the elastic members can be partially received in a respective one of the receiving holes.

The lamp can have a retaining ring arranged in a respective one of the receiving holes of the projections underneath a respective one of the elastic members.

A spring nut can be located between a respective one of the elastic members and the flange of the housing. The spring nut has a first leg extending between a respective one of the elastic members and the flange, and a second leg located at an opposite side of the flange and provided with a thread.

A plurality of threaded elements extending through a respective one of the projections of the supporting housing and having a threaded portion which is screwed in the second leg of the spring nut can connect the housing with the flange.

The reflector can be turnably mounted on the supporting casing by a receiving block provided on the supporting casing, and a projection provided on the reflector and turnably received in the receiving block.

The receiving block can include a hole having a wider portion and a narrower portion, so that the projection can be introduced into the wider portion through the narrower portion and retained in the latter with a snap action.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a view showing a horizontal longitudinal section of the lamp in accordance with the present invention; and FIG. 3 is a view showing a section taken along the line III—III in FIG. 2 and showing a mounting region of a reflector of the inventive lamp.

DESCRIPTION OF A PREFERRED EMBODIMENT

Figure 1:
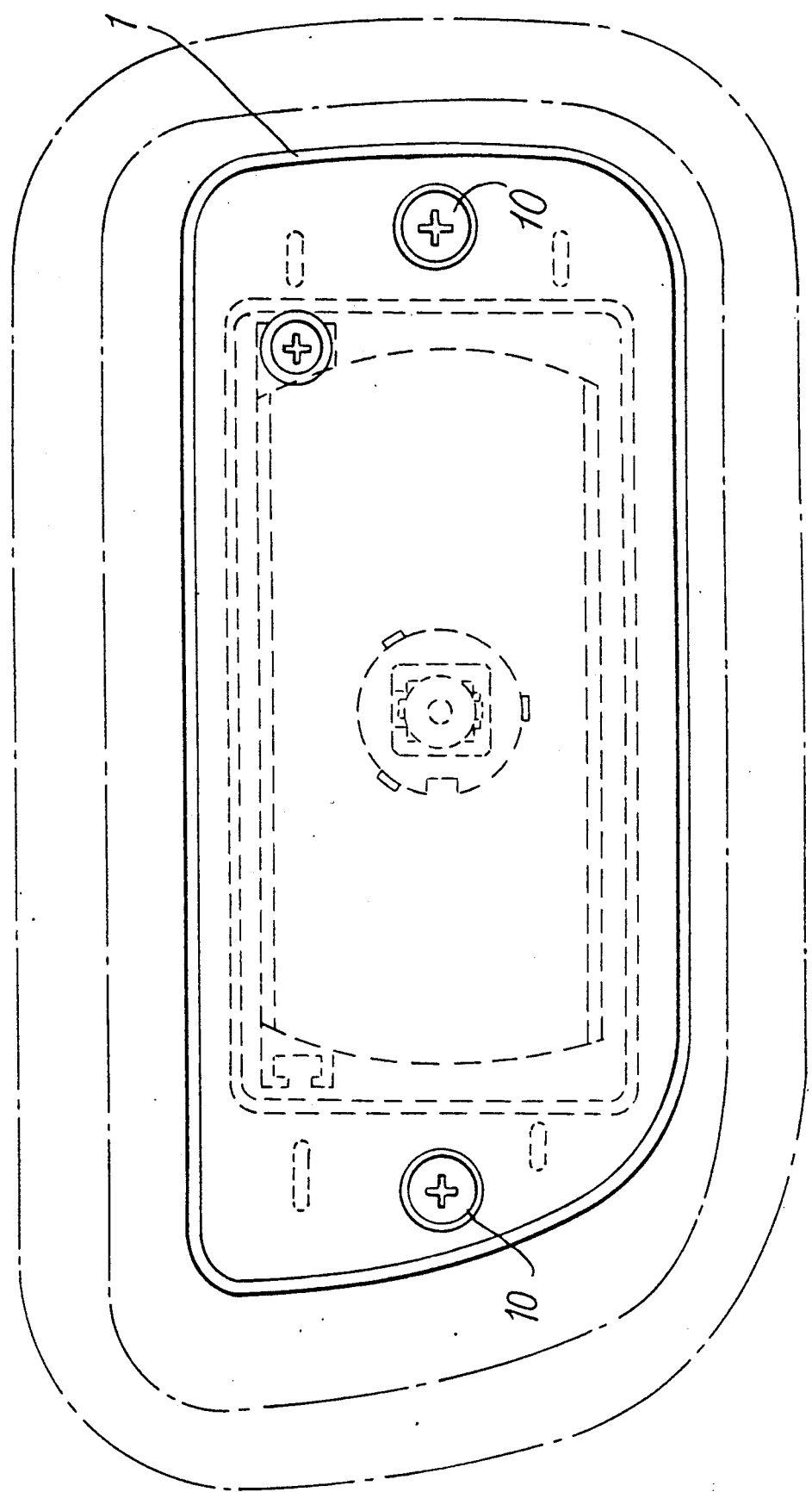
FIG. 1 is a front view of a lamp for a vehicle, in accordance with the present invention.

A lamp for a vehicle, for example a fog lamp, in accordance with the present invention has a housing which is identified as a whole with reference numeral 1. The lamp further has a supporting casing 2 which turnably supports a reflector 3 and fixedly supports a lens 4. A light source 5 is located between the reflector 3 and the lens 4.

The supporting casing 2 is connected with the housing 1 by connecting elements which will be described hereinbelow. The housing 1 has a flange 6 which extends inwardly and is provided with a plurality of openings 7. The supporting casing 2 has a plurality of projections 8 spaced from one another in a peripheral direction and each having an opening 9. A threaded member 10 extends through the opening 9 of each projection 8 of the supporting casing 2 and the respective opening 7 of the flange 6 of the housing 1. A spring or clip nut 11 surrounds the flange 6 at both axial ends thereof and has one leg extending under the flange 6 in FIG. 2 and another leg extending above the flange 6 and provided with a threaded opening 12. A threaded end portion 13 of the bolt 10 is screwed in the threaded opening 12 of the nut 11.

Each of the projections 8 of the supporting casing 2 is also provided with a blind hole 14. An elastic element 15 is located in the hole 14 between the lower leg of the nut 11 and a retaining ring 16. With such a construction the supporting casing 2 and the housing 1 are connected with one another in a manner which permits compensation of manufacturing tolerances and dampening of vibrations of the lamp during driving.

It should be mentioned that the reflector 3 is connected with the supporting casing 2 pivotally by means of end projections 17 which are engaged in holes 18. The holes 18 are formed in blocks 19 fixedly attached to the supporting casing 2. As can be seen from FIG. 3, the projections 17 can be pushed into the holes 18 through a narrow portion 20 due to the elasticity of the blocks 19 and snapped in the openings 18. The lens 4 is connected with a supporting casing 2 immovably by an intermediate element 21.

It will be understood that each of the elements described above, or two or more together, may also find a useful application in other types of constructions differing from the types described above.

While the invention has been illustrated and described as embodied in a lamp for a vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A lamp for a vehicle, comprising a lens; a reflector; a supporting casing supporting said lens and said reflector; a housing; means for compensating manufacturing tolerances and dampening vibrations and including an elastic element arranged between said supporting casing and said housing; and means for turnably mounting said reflector on said supporting casing, said mounting means including a receiving block provided on said supporting casing, and a projection provided on said reflector and turnably received in said receiving block.

2. A lamp as defined in claim 1, wherein said receiving block includes a hole having a wider portion and a narrower portion, so that said projection can be introduced into said wider portion through said narrower portion and retained in the latter with a snap action.

3. A lamp for a vehicle, comprising a lens; a reflector; a supporting casing supporting said lens and said reflector; a housing; and means for compensating manufacturing tolerances and dampening vibrations and including an elastic element arranged between said supporting casing and said housing, said elastic element including a plurality of elastic members distributed over a periphery at distances from one another and located between said supporting casing and said housing, said housing having an inwardly directed flange, said supporting casing having a plurality of projections spaced from one another in a peripheral direction, each of said elastic members being located between said housing and a respective one of said projections of said supporting casing.

4. A lamp as defined in claim 3, wherein each of said projections has a receiving hole, each of said elastic members being partially received in a respective one of said receiving holes.

5. A lamp as defined in claim 4; and further comprising a retaining ring arranged in a respective one of said receiving holes of said projections underneath a respective one of said elastic members.

6. A lamp as defined in claim 5; and further comprising a spring nut each located between a respective one of said elastic members and said flange of said housing.

7. A lamp as defined in claim 6, wherein said spring nut has a first leg extending between a respective one of said elastic members and said flange, and a second leg located at an opposite side of said flange and provided with a thread.

8. A lamp as defined in claim 7; and further comprising means for connecting said supporting housing with said flange and including a plurality of threaded elements, each of said threaded elements extending through a respective one of said projections of said supporting housing and having a threaded portion which is screwed in said second leg of said spring nut.

* * * * *